United States Patent Office 3,479,430
Patented Nov. 18, 1969

3,479,430
INDIRECT PASSIVE IMMUNIZATION AGAINST TRANSMISSIBLE GASTROENTERITIS VIRUS IN NURSING PIGLETS AT BIRTH BY ACTIVE IMMUNIZATION OF SOWS PRIOR TO FARROWING WITH TRANSMISSIBLE GASTROENTERITIS VACCINE AND METHOD OF PRODUCING THE SAME
Clarence J. Welter, Des Moines, Iowa, assignor to Diamond Laboratories, Inc., Des Moines, Iowa, a corporation of Iowa
No Drawing. Original application Sept. 22, 1964, Ser. No. 398,398. Divided and this application Aug. 24, 1967, Ser. No. 671,526
Int. Cl. A61k 23/00; C12k 5/00
U.S. Cl. 424—89
2 Claims

ABSTRACT OF THE DISCLOSURE

Transmissible gastroenteritis virus is grown and propagated in tissue cultures by inoculating virulent virus particles into a first tissue culture, allowing the virus to grow, introducing the viral particles into other tissue cultures until a continuated virus is obtained. A final virus culture can be harvested and combined with a stabilizer and further incubated to inactivate the virus. Sows and their nursing pigs can be immunized by injecting into the pregnant sow before farrowing the vaccine thus produced.

---

This application is a division of my copending application Ser. No. 398,398, filed Sept. 22, 1964, now abandoned.

This invention relates to the art of immunizing animals against transmissible gastroenteritis, herein referred to as T.G.E. More particularly the invention relates to the isolation and propagation of T.G.E. virus in tissue cultures, a means of developing attenuated T.G.E. virus, and to processes of preparing killed and attenuated vaccines therefrom. It also includes the novel vaccines thus prepared and their use in protecting sows and their nursing pigs and immunologically mature swine.

Transmissible gastroenteritis is a highly infectious and widespread swine disease which causes serious economic losses. T.G.E. may affect swine of all breeds and all ages, but causes extensive mortality losses only in very young pigs. T.G.E. was first described by Doyle and Hutchings in 1946 (J.A.V.M.A., vol. 108: 257–259), and since that time it has been reported in many states in this country and in other countries.

It has been the practice in the field to feed infective intestinal tracts of infected pigs to sows three or more weeks before farrowing. As a result passive immunity is transferred to the baby pigs. This practice, however, is unsound in that it serves to further disseminate the disease. Heretofore, it has not been possible to consistently pass the viral agent in tissue culture and control T.G.E. by immunizing the animals with tissue culture vaccines. Numerous attempts to isolate and serially propagate T.G.E. virus have failed. The present discovery that the T.G.E. virus can be propagated in tissue cultures and a vaccine prepared therefrom is the first of its kind, and, consequently, of considerable commercial importance.

An object of the invention is provision of a novel method of initiating growth of T.G.E. virus, and propagating it in tissue cultures.

Another object is the provision of fluids with a high content of T.G.E. viral particles in highly purified form free from excessive cellular debris which can produce untoward reactions in vaccinated animals.

An additional object is the provision of novel inactivated or attenuated vaccines containing virus produced in tissue cultures which will immunize sows, thereby protecting them and their offspring while they are nursing and all other swine, which are immunologically mature, against T.G.E.

A further object is the provision of a novel method of attenuating T.G.E.

Still further objects and the entire scope of applicability of the invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the use of the following methods. The growth of the T.G.E. virus is initiated and the virus is propagated in tissue cultures of bovine, porcine, canine (e.g. dog or fox), feline (e.g. cat), ferret, ovine and other animal tissues. The propagation can be in the same or different tissues than those employed in the first passage.

Attenuation of T.G.E. virus is accomplished by propagation of the virus in tissue cultures at intervals of 24 hours or less until the virus no longer produces symptoms of T.G.E. in baby pigs. The virus is serially passed at such intervals of 24 hours or less until the virus is non-pathogenic and a vaccine prepared therefrom will stimulate immunogenesis in swine without producing symptoms of T.G.E. and without spreading foreign viruses.

Preferably kidney tissues are employed in making the tissue cultures although it should be understood that other tissues can also be used.

After initiation of the grotwh of the T.G.E. virus and propagation thereof a vaccine is prepared by harvesting the virus containing cultures, preferably adding a stabilizer and then incubating the vaccine to inactivate the T.G.E. virus. The vaccine can be stored as a liquid or it can be frozen, e.g. it can be freeze dried.

The inactivated T.G.E. vaccine is used to immunize sows and their nursing pigs against T.G.E. by injecting the sow before farrowing with the vaccine to stimulate the production of antibodies which protects the sow, and at the same time are passed in the milk, thereby protecting the nursing piks. The sows can be injected intramuscularly or subcutaneously.

Unless otherwise indicated all parts and percentages are by volume.

EXAMPLE 1

The original starting virus was obtained from baby pigs infected with T.G.E. The intestinal tracts of the infected pigs were stripped of their mucosa. The mucosa was then diluted with a buffered salt solution, supplemented with horse serum and homogenized. The buffered salt solution was composed of 16 grams $KH_2PO_4$, 34 grams of $$Na_2HPO_4$$

and 8.5 parts of NaCl in 1000 ml. of aqueous solution. One part of horse serum by volume was added to nine parts of the salt solution. One part of mucosa was added to four parts by volume of the complete salt solution. This buffered salt solution is entirely different than Hanks balanced salt solution and other salt solutions conventionally used for tissue culture nutrient fluids.

The homogenate was centrifuged and passed through a Seitz filter to render it bacteriologically sterile. All of the above steps were carried out at 0 to 4° C.

The filtrate prepared in Example 1 was then added to various tissue culture systems, monolayer or suspension which was prepared according to commonly used procedures. The medium generally employed was 9 to 9.5 parts by volume of Hanks balanced salt solution (Hanks J. Cell Comp. Physical, vol. 31, pages 235–260 1948), and 0.5 to 1 part by volume of inactivated horse serum. Other media which are satisfactory for initiating and maintaining infected cultures include (a) Earles BSS plus 5–10% horse serum and (b) Medium 199 of Morgan et al. (Proc. Soc. Exp. Biol. and Med., vol. 73, pages 1–8, 1959) supplemented with 5–10% horse serum. Optionally lactalbumin hydrolysate in a final concentration of 0.5% can be added to the above mentioned media. In propagating and attenuating the virus in accordance with this invention, any nontoxic nutrient fluid tissue culture medium can be utilized. In the following examples the medium employed was 9 parts of Hanks balanced salt solution and 1 part inactivated horse serum (by volume).

The pH of the medium was adjusted to 7.2 to 7.6 with incubation of the cultures at 35 to 38° C. Serial passage of T.G.E. virus in tissue cultures was carried out at intervals of 24 hours or less, most frequently at 6 to 14 hours, by inoculating fresh tissue cultures with pooled diluted fluids from the previous passage. Harvested and pooled fluids were also orally inoculated into baby pigs at every fifth passage level to check for presence and/or survival of the virus.

T.G.E. virus virulent for baby pigs was present in titers of at least $10^{-5}$, after 5 to 15 passages. Isolation and propagation of T.G.E. virus in tissue culture has been accomplished from different pigs infected with T.G.E. In each case the presence of virus was demonstrated by oral inoculation of baby pigs which developed clinical symptoms of T.G.E. and died. In addition, the presence of virus was demonstrated by electron microscopic examination of tissue culture fluids. Virus particles observed in tissue culture fluids were identical to virus particles isolated from intestinal mucosal extracts of infected baby pigs.

Electron microscopic identification of this virus as T.G.E. was accomplished at the 5th, 10th, 15th and 40th tissue culture passage levels. At higher passage levels (20 to 40) the virulence of the virus for baby pigs became progressively less until it was rendered avirulent.

It has been found that the tissue culture techniques of the invention gave a high yield of virus from the tissues of swine, sheep, cattle, dogs, terrets and cats. Other animal tissues can also be employed to support T.G.E. virus growth. Production of vaccine from tissues other than porcine, particularly canine, e.g. dogs and foxes, eliminates undesired porcine contaminating viruses. Canine viruses which may be present in the cultivated canine tissues or canine tissue cells employed in the present method are not pathogenic to swine and therefore do not infect swine to which the canine origin vaccine of the invention is administered.

The virus produced by the invention may be diluted according to potency or it may have added thereto stabilizers or other nontoxic substances. For use as a vaccine, the virus may be disiccated, e.g. by freeze drying, or it may be prepared in liquid form.

Administration of the vaccines of the invention is practical only to swine which can produce protective antibodies. Since baby pigs are immunologically immature at the time they are most susceptible to T.G.E., they cannot be successfully vaccinated. However, immunity can be conferred on nursing pigs by injection of the T.G.E. vaccine of the invention into sows prior to birth of their pigs. Pigs which nurse from said vaccinated sows are immune to T.G.E.

EXAMPLE 2

The filtrate was prepared according to Example 1 and T.G.E. virus was propagated according to the process described above using 9 parts Hanks balanced salt solution and 1 part inactivated horse serum. Virus-containing fluids from the 10th to 12th issue culture passages were diluted 1 to 20 and inoculated into standard Povitsky bottles containing a monolayer of dog kidney cells. The bottles were incubated at 37° C. for 10 hours at which time no gross cytopathic effect was observed. The monolayers were detached into the fluids by freezing and thawing. Identity of virus content in the fluids was determined by oral inoculation of 1 ml. doses of each serial tenfold dilution into baby pigs which were housed in individual isolated cages. Virus infectivity titers of at least $10^{-5}$ were observed.

When it is desired to prepare an inactivated vaccine, the virus containing culture is combined with a stabilizing menstrum and incubated at 25° C., preferably for five days.

After incubation the vaccine can be freeze dried or it can be stored at a low temperature, e.g. 4° C. or −35° C. Inactivation of the virus was confirmed when oral administration of 10 ml. of the fluid did not produce T.G.E. in baby pigs.

EXAMPLE 3

The effectiveness of the vaccines produced by Example 2 were tested by intramuscular inoculation of sows in their last six weeks of gestation. All sows were from specific pathogen free stock and were from farms which had no T.G.E. for over 20 years. Forty-eight hours after birth two to three pigs (controls) from each litter were removed from the sow to isolation quarters. These controls, which received no sow's milk for two days, and were therefore susceptible to T.G.E., and all pigs remaining with the sow were orally challenged at four days of age with 1,000 infectious doses of T.G.E. Pigs farrowed by a non-vaccinated sow (control) were also challenged and the results appear in Table 1.

TABLE 1.—IMMUNIZATION OF SOWS WITH INACTIVATED TISSUE CULTURE T.G.E. VIRUS

| | Inoculum (ml.) | Vaccination-Days before Farrowing | No. Days Sow was Sick | Challenge Results | | | |
|---|---|---|---|---|---|---|---|
| | | | | No. Dead Pigs from Challenge/Total No. Challenged | | No. Pigs with T.G.E. Symptoms/Total No. Challenged | |
| | | | | Pigs with Sow | Isolated Pigs | Pigs with Sow | Isolated Pigs |
| Sow No.[1]: | | | | | | | |
| 1 | 4 | 15 | 0 | 0/5 | [2] 2/2 | 0/5 | 2/2 |
| 2 | 2 | 19 | 0 | 0/5 | [2] 2/2 | 0/5 | 2/2 |
| 3 | 4 | 13 | 0 | 0/4 | 2/2 | 0/4 | 2/2 |
| 4 | 2 | 12 | 0 | 0/5 | 3/3 | 0/5 | 3/3 |
| 5 | 0 | Control Sow | 2 | 6/6 | 2/2 | 6/6 | 2/2 |
| 6 | 2 | 30 | 2 | 1/6 | 2/2 | 6/6 | 2/2 |
| 7 | 1 | 33 | 2 | 2/4 | 2/2 | 4/4 | 2/2 |
| 8 | .5 | 41 | 0 | 2/3 | 1/1 | 3/3 | 1/1 |
| 9 | 2 | 40 and 19 | 1 | 0/9 | 2/2 | 0/9 | 2/2 |
| 10 | 0 | Control Sow | 6 | 9/9 | 2/2 | 9/9 | 2/2 |

[1] Sows 1 and 2 received non-desiccated vaccine. Sows 3, 4, 6, 7, 8 and 9 received desiccated and reconstituted vaccine.
[2] Presence of T.G.E. virus confirmed in other pigs by oral inoculation of bacteriologically sterile intestinal extracts from these pigs.

Sows which were vaccinated with 2 or 4 ml. of inactivated T.G.E. vaccine before farrowing conferred to their pigs a passive immunity to T.G.E. Pigs (controls) which were transferred from the sow to isolation and challenged two days later with 1,000 infectious doses of T.G.E. generally developed watery diarrhea and vomition in 24 to 48 hours and died within four to five days after challenge. Experimentally infected immune pigs nursing from the vaccinated sow showed no symptoms of T.G.E. as long as they could obtain milk from the sow. In some cases the sow, which was not experimentally infected, developed a slight fever, diarrhea and agalactia for one or two days. As a result the pigs could not obtain milk from this sow and therefore developed diarrhea. Resumption of lactation in the sow induced recovery of the diarrheic pigs. Other experimental data have confirmed these observations that a continuous supply of sow's milk to the pig is necessary for protection from T.G.E.

Preferably vaccination should consist of at least a 2 ml. dose administered within six weeks of farrowing.

Non-vaccinated sows, on the other hand, did not confer immunity to T.G.E. to their pigs. These pigs developed watery diarrhea and vomition in 24 to 48 hours and died within six to seven days after challenge. The vaccine was also an effective immunizing agent for sows. Non-vaccinated sows developed more severe symptoms of T.G.E. in comparison to vaccinated sows.

EXAMPLE 4

Fluids containing T.G.E. virus, propagated, as described in Example 2 for 40 passages on dog kidney, were combined with the stabilizing menstrum in a ratio of 50% fluid to 50% stabilizer and freeze dried. The avirulence of the vaccine was tested by several oral inoculations of the equivalent of five or ten ml. of undiluted tissue culture fluids into baby pigs. No symptoms of T.G.E. were observed during the ten day to two week post-inoculation observation period. Presence of T.G.E. virus was confirmed by electron microscopic examination of the fluids.

EXAMPLE 5

The effectiveness of the attenuated vaccine produced by Example 4 was tested by intramuscular inoculation of sows 17 or 34 days before farrowing. These results are dep